(12) United States Patent
Behrens

(10) Patent No.: US 10,330,078 B2
(45) Date of Patent: Jun. 25, 2019

(54) FLUID TURBINE WITH ROTOR

(71) Applicant: Cassius Advisors GmbH, Münster (DE)

(72) Inventor: Michael Behrens, Münster (DE)

(73) Assignee: WindTree GmbH, Stralsund (DE)

( * ) Notice: Subject to any disclaimer, the term of this patent is extended or adjusted under 35 U.S.C. 154(b) by 350 days.

(21) Appl. No.: 15/271,607

(22) Filed: Sep. 21, 2016

(65) Prior Publication Data

US 2017/0009736 A1    Jan. 12, 2017

Related U.S. Application Data

(63) Continuation-in-part of application No. PCT/EP2015/057407, filed on Apr. 2, 2015.

(60) Provisional application No. 61/974,540, filed on Apr. 3, 2014, provisional application No. 61/974,546, filed on Apr. 3, 2014, provisional application No. 61/974,547, filed on Apr. 3, 2014.

(30) Foreign Application Priority Data

Apr. 3, 2014 (DE) .................. 10 2014 104 725
Apr. 3, 2014 (DE) .................. 10 2014 104 726
Apr. 3, 2014 (DE) .................. 10 2014 104 727

(51) Int. Cl.
*F03D 3/04* (2006.01)
*F03D 3/00* (2006.01)
*F03B 17/06* (2006.01)
*F03D 3/06* (2006.01)

(52) U.S. Cl.
CPC ............ *F03D 3/005* (2013.01); *F03B 17/061* (2013.01); *F03D 3/049* (2013.01); *F03D 3/067* (2013.01); *F05B 2220/30* (2013.01); *Y02E 10/28* (2013.01); *Y02E 10/74* (2013.01)

(58) Field of Classification Search
CPC ............................. F03D 3/0409; F03D 3/005
See application file for complete search history.

(56) References Cited

U.S. PATENT DOCUMENTS

| | | | |
|---|---|---|---|
| 252,947 A | 1/1882 | Jones et al. | |
| 2,510,501 A | 6/1950 | Johnson | |
| 4,047,834 A * | 9/1977 | Magoveny | F03D 3/0409 415/53.1 |
| 4,857,753 A * | 8/1989 | Mewburn-Crook | F03D 3/0409 290/55 |
| 5,976,759 A | 11/1999 | Urano | |

(Continued)

FOREIGN PATENT DOCUMENTS

| | | |
|---|---|---|
| CN | 101907059 A | 12/2010 |
| DE | 3636781 A1 | 5/1988 |

(Continued)

*Primary Examiner* — Woody A Lee, Jr.
(74) *Attorney, Agent, or Firm* — Hudak, Shunk & Farine Co. LPA

(57) ABSTRACT

A fluid turbine is provided, comprising a rotor with a rotation axis and at least two rotor blades arranged within a housing, wherein a top and a bottom of the housing are arranged essentially perpendicular to the rotation axis, wherein the rotor is rotatable relative to the housing, and wherein at least one support element is arranged between the top and the bottom of the housing. Due to the at least one support element, the fluid turbine has particularly high efficiency.

8 Claims, 10 Drawing Sheets

(56) References Cited

U.S. PATENT DOCUMENTS

| | | | |
|---|---|---|---|
| 6,147,415 A | 11/2000 | Fukada | |
| 2003/0133782 A1 | 7/2003 | Holter et al. | |
| 2005/0201855 A1 | 9/2005 | Fan | |
| 2006/0140765 A1 | 6/2006 | Shih | |
| 2006/0222483 A1* | 10/2006 | Seiford, Sr. | F03D 3/005 415/4.4 |
| 2009/0092490 A1 | 4/2009 | Brooks | |
| 2012/0070282 A1* | 3/2012 | Khan, Sr. | F03D 3/061 416/3 |
| 2012/0292916 A1* | 11/2012 | Wang | F03D 3/067 290/55 |
| 2013/0091861 A1* | 4/2013 | Groot | F03D 3/005 60/784 |
| 2013/0149131 A1* | 6/2013 | O'Keefe | F03D 3/0409 415/208.1 |
| 2013/0323056 A1 | 12/2013 | Su | |

FOREIGN PATENT DOCUMENTS

| | | | |
|---|---|---|---|
| DE | 4434764 A1 | 4/1995 | |
| DE | 4403419 A1 | 8/1995 | |
| DE | 202004017309 U1 | 2/2005 | |
| DE | 202010003361 U1 | 8/2010 | |
| DE | 102009042536 A1 | 4/2011 | |
| DE | 102011014476 A1 | 7/2012 | |
| EP | 0229001 A1 | 7/1987 | |
| EP | 2 532 884 A1 | 12/2012 | |
| FR | 538 755 A | 6/1922 | |
| FR | 538755 A * | 6/1922 | F03D 3/0418 |
| FR | 822092 | 12/1937 | |
| KR | 20120063888 A | 6/2012 | |
| RU | 2418191 C1 | 5/2011 | |
| WO | 2009084992 A1 | 7/2009 | |
| WO | 2010131891 A2 | 11/2010 | |
| WO | 2011045820 A1 | 4/2011 | |
| WO | 2011136649 A1 | 11/2011 | |
| WO | 2013108953 A1 | 7/2013 | |

* cited by examiner

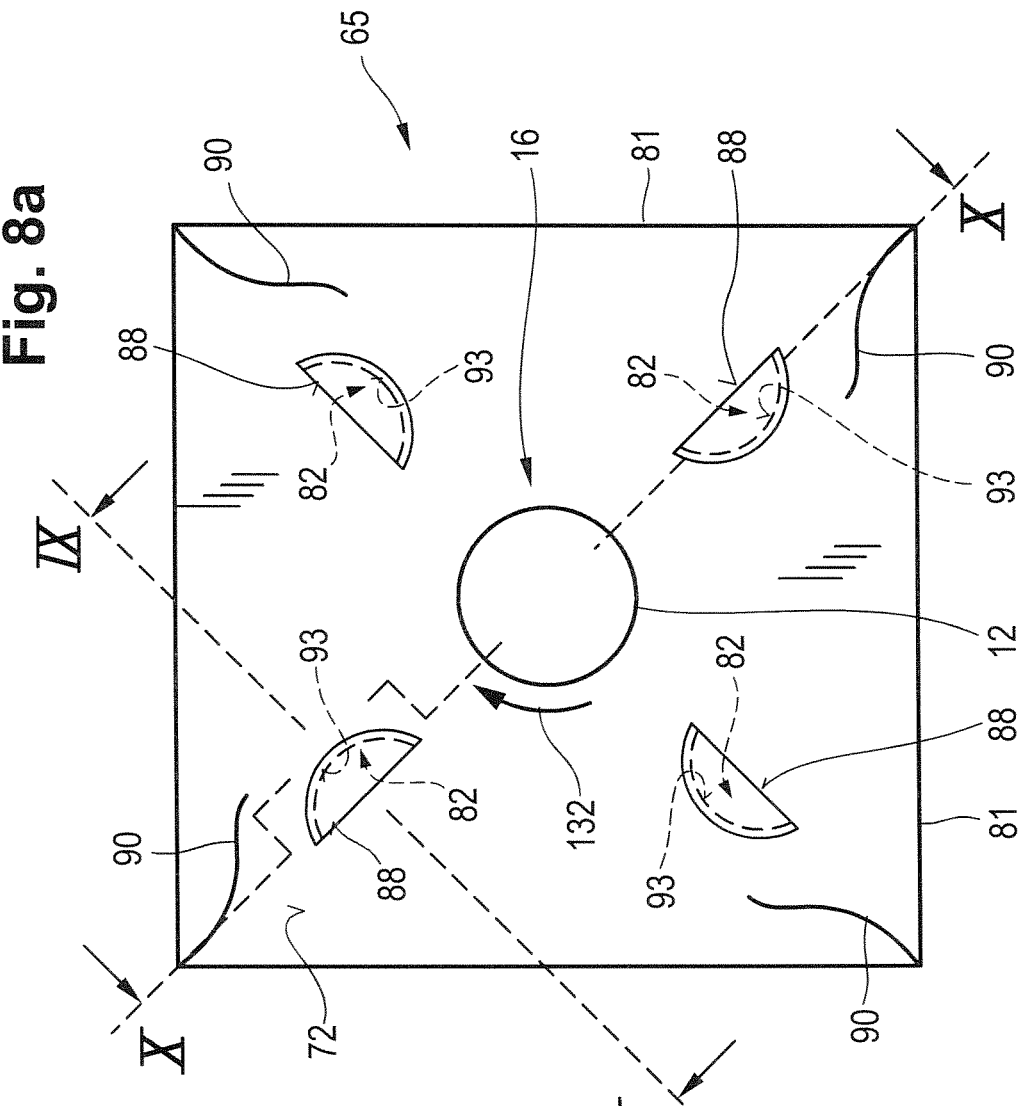

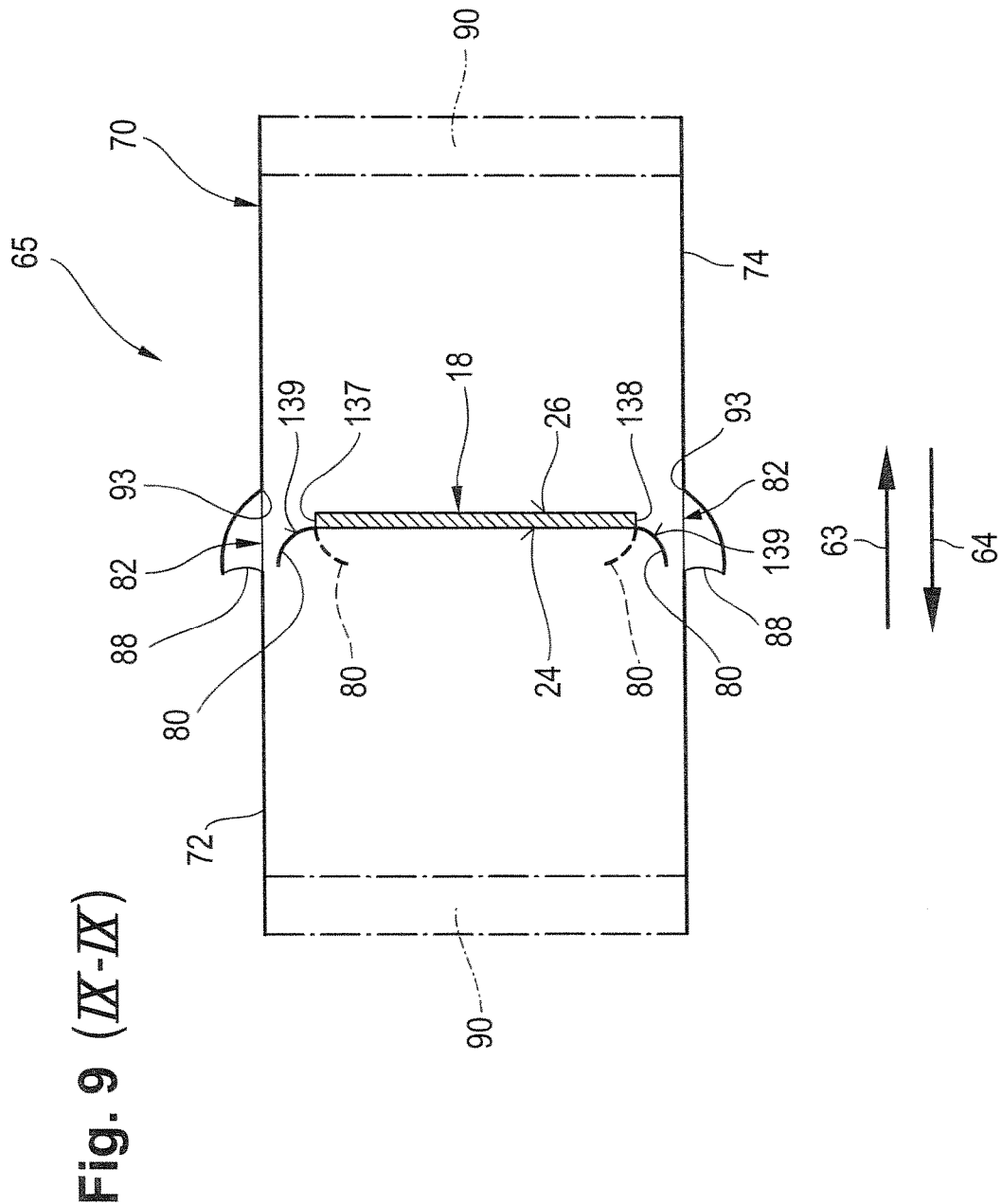

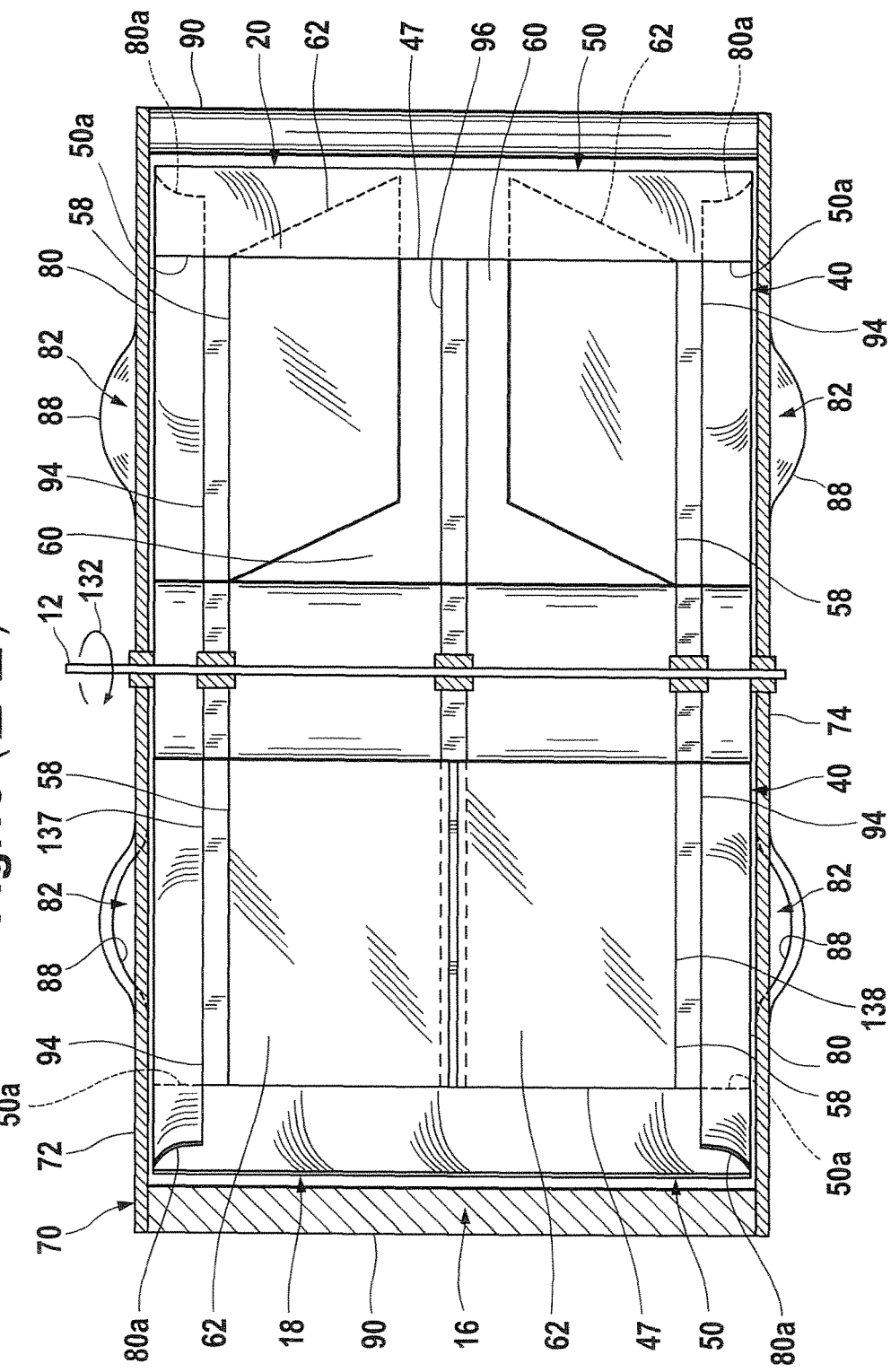

FLUID TURBINE WITH ROTOR

FIELD OF THE INVENTION

The present invention relates to a fluid turbine, comprising a rotor with a rotation axis arranged within a housing, wherein a top and a bottom of the housing are arranged essentially perpendicular to the rotation axis, wherein the rotor is rotatable relative to the housing.

BACKGROUND OF THE INVENTION

A rotor comprising a vertical rotation axis and at least two rotor blades arranged on the rotation axis, wherein at least one rotor blade comprises a first portion and a second portion, wherein the second portion is moveably arranged on the first portion, may be used to generate energy from water, air or other fluid flows. In the operation of such a rotor, at least one rotor blade moves in the direction of or together with the fluid flow and at least one rotor blade moves against the direction of the fluid flow or against the fluid flow. A wind motor is disclosed for example in FR822092, wherein the rotor blades comprise a vane and a flap element which is moveably arranged at the vane. Under normal wind conditions, the flap is positioned on a back side of the vane, but under extreme wind speed, the flap swings out of the back side of the vane. This way, a back pressure is created between the vane and the flap, so that the wind motor is decelerated to avoid damage due to extreme wind speed.

SUMMARY OF THE INVENTION

It is an object of the present invention to provide a fluid turbine comprising a rotor, which has high efficiency.

This object is achieved by a fluid turbine comprising a rotor with a rotation axis and at least two rotor blades arranged within a housing, wherein a top and a bottom of the housing are arranged essentially perpendicular to the rotation axis, wherein the rotor is rotatable relative to the housing, and wherein at least one support element is arranged between the top and the bottom of the housing.

The top and/or bottom of the housing can have any shape, e.g. square, round, or polygonal. An advantage of the fluid turbine is that the fluid flow can be kept in the area of the rotor blades and thus be effectively used to rotate the rotor. Preferred fluids are e.g. air or water.

The or each support element mainly serves to support the top and bottom so that the rotor blades are free to rotate between the top and bottom of the housing.

Preferably, the or each support element is arranged outside the diameter of the rotor disk of the rotor. Thus, the or each support element does not contact the rotor blades.

In preferred embodiments, the or each support element is formed continuously from the top to the bottom of the housing. This provides a solid support for the top and the bottom of the housing.

Advantageously, the or each support element has a curved configuration. With a curved configuration, the fluid flow can be guided so that it impinges, for example, at the best possible angle and/or with a changed speed, on the rotor blades.

In further preferred embodiments, the or each support element has a curved, round, wedge-shaped or square cross-section. Support elements comprising these cross-sections can influence the fluid flow so that, for example, the direction and/or speed of the fluid flow impinging onto the rotor blades is improved.

Preferably, an angle $\alpha$ between an end of the or each support element and a line pointing to the rotation axis has values from 30° to 80°. This way, the fluid flow can be guided in a certain direction onto the rotor blades to improve the effect of the fluid flow impinging on the rotor blades.

Preferably the distance between the top of the housing and the rotor blades and between the bottom of the housing and the rotor blades is essentially constant. This is the best way of utilizing the fluid flow since there are no areas between the rotor blade and the top and bottom of the housing where the fluid flow passes quicker, for example, than others. The fluid flow is thus directed particularly uniformly onto the outside of the rotor blade.

In preferred embodiments, at least one fluid slot with a cover element is arranged in the top and/or the bottom of the housing. It is arranged in such a manner that a fluid flow can pass through the fluid slot to the front side of the rotor blade or that the fluid flow creates a suction as it passes the fluid slot due to the Bernoulli effect, by which the fluid, e.g. air or water, is sucked out of the housing from the area of the back side of the rotor blade. This can increase the pressure on the front side of the rotor blade, or reduce the flow resistance when the rotor blade is returned. This leads to an increase in the efficiency of the fluid turbine. Preferably, at least two fluid slots are arranged in the top and/or on the bottom of the housing. The first fluid slot is preferably arranged in such a manner that the fluid flow passes through the first fluid slot into the housing and onto the front surface of the rotor blade and exerts a higher pressure onto the latter. The second fluid slot is preferably arranged in such a manner that the fluid flow creates a suction as it passes the fluid slot due to the Bernoulli effect, by which the fluid, e.g. air or water, is sucked out of the housing from the area of the back side of the rotor blade, thus reducing the flow resistance when the rotor blade is returned. In this way the efficiency of the fluid turbine can be further improved. In particularly preferred embodiments at least two fluid slots as described above are arranged both in the top and the bottom of the housing, whereby the efficiency of the fluid turbine can be even further improved.

An example of a rotor that can be operated in the above described fluid turbine is described below. However, the fluid turbine can comprise any other suitable rotor.

The rotor may comprise a vertical rotation axis and at least two rotor blades arranged on the rotation axis, wherein at least one rotor blade comprises a first portion and a second portion, wherein the second portion is moveably arranged on the first portion, wherein a virtual elongation of the first portion is formed by a virtual tangent placed on the end of the first portion facing away from the rotation axis and that the second portion is arranged on the first portion in such a manner that an angle formed between the virtual elongation of the first portion and the second portion has a variable value between about 0° and 90°.

By arranging the second portion moveably on the first portion as described above, the rotor blade can either provide a surface that has a higher resistance against the fluid flow or a surface that has a lower resistance against the fluid flow. The rotor blade has a higher resistance against the fluid flow when the angle formed between the virtual elongation of the first portion and the second portion has a low value, for example 0°. This is also referred to as the swung-out position of the second portion. When the fluid flow impinges on a front side of the rotor blade, it can keep the second portion in the swung-out position so that the angle is at low values. Thus, the rotor blade is effectively moved in the direction of the fluid flow. In contrast, due to the moveably arranged second portion, the angle formed between the virtual elongation of the first portion and the second portion is enlarged, for example to 90°, when the fluid flow impinges on a back side of the rotor blade. This is also referred to as the folded-in position of the second portion. The fluid flow can pass the second portion without impinging on it or merely at a flat angle. Thus, the side of the rotor blade moving against the direction of the fluid flow is more aerodynamic, in particular on the end of the rotor blade facing away from the rotation axis, and has a lower flow resistance.

In preferred embodiments, the angle formed between the virtual elongation of the first portion and the second portion has a value between about 5° and 90°, preferably 5° and 80°, more preferably 10° and 75°. In the swung-out position of the second portion, angles of 5° or more, or 10° or more, provide a rotor blade where the fluid flow can be more effectively used on the front side of the rotor blade. In the folded-in position of the second portion, angles of 90° or less, 80° or less, or 75° or less, provide a rotor blade where the fluid flow can effectively pass the back side of the rotor blade. At the same time, the second portion can be moved from the swung-out position to the folded-in position and vice versa more quickly.

Preferably, at least one of the first and the second portions is at least partially curved. Curved parts of the first and/or second portion can provide a more aerodynamic surface for the fluid flow impinging and/or flowing along the rotor blade than straight parts.

This also has a positive effect on the movement due to the fluid flow of the second portion from the swung-out position to the folded-in position and vice versa.

Both the first and the second portions are preferably at least partially curved, wherein the first portion and the second portion each have a concave side and a convex side and wherein the two portions are arranged in such a manner that, in the radial direction, the concave side of the first portion is followed by the concave side of the second portion. This has the advantage that the rotor blade as a whole is more aerodynamic for the fluid flow impinging and/or flowing along the rotor blade.

Preferably, the second portion is formed from an elastic material. By these means, the second portion can easily and at a lower sound level be moved from a swung-out to a folded-in position and vice versa.

In preferred alternative embodiments, the second portion is pivotably arranged on the first portion, wherein a pivot axis is essentially parallel to the rotation axis. This has the advantage that the second portion is particularly freely moveable and provides for less fatigue.

Preferably, the first portion of the rotor blade comprises at least one opening with an openable closure element. The closure element is arranged in such a manner that the closure element opens the opening due to the fluid flow when the rotor blade is moving against the fluid flow. By these means, the flow resistance of the rotor blade is reduced when it is returned against the fluid flow. The closure element is also arranged in such a manner that it closes the opening due to the fluid flow when the rotor blade is moving in the direction of the fluid flow. In this way the flow resistance of the rotor blade remains just as high when it is receiving the fluid flow as it would be without the at least one opening in the first portion of the rotor blade. This helps to further improve the efficiency of the rotor.

The openable closure element is preferably arranged on the first portion at a mounting axis essentially perpendicular or parallel to the rotation axis. In further preferred embodiments, the first portion can comprise at least two openings with an openable closure element, wherein one openable closure element is arranged at a mounting axis essentially perpendicular to the rotation axis and one openable closure element is arranged at a mounting axis essentially parallel to the rotation axis. The openable closure element can be mounted pivotably and/or be made from an elastic material.

Advantageously, the rotor blade comprises a cut-out near the rotation axis. By these means, the fluid flow can pass through these cut-outs and accumulation of the fluid flow will not be too strong.

Preferably, a percentage of area of the at least one opening with an openable closure element and/or the cut-out near the rotation axis is at least 20%, preferably 50%, more preferably 70%. In this way, on the one hand, part of fluid flow can pass through these cut-outs and accumulation of the fluid flow will not be too strong, and, on the other hand, the other part of the fluid flow can be effectively used to move the rotor blade in the direction of the fluid flow.

In advantageous embodiments, the at least two rotor blades are arranged at a predetermined distance to each other and to the rotation axis such that they overlap each other in the area of the rotation axis. By these means, the fluid flow can pass the area near the rotation axis and be directed from the front side of one rotor blade onto the front side of the at least one other rotor blade.

In preferred embodiments at least one wing element is moveably arranged at an upper edge and/or a lower edge of at least one rotor blade in the area of the first portion. The wing element is preferably arranged in such a manner that when the fluid flow impinges on the front side of the rotor blade, it flips up and thus increases the surface area of the rotor blade. By these means the fluid flow can be even better received by the rotor blade. When the rotor blade is returned against the fluid flow, the wing element folds towards the front side of the rotor blade due to the fluid flow impinging on the back side of the wing element, so that no additional surface area results and thus the rotor blade does not have a greater flow resistance when moved against the fluid flow. In this way the efficiency of the rotor can be even further improved. It is preferably formed in such a manner that it cannot be pressed beyond the top or bottom edge by the fluid flow into the area of the back side of the rotor blade. The wing element can for example be mounted swivably on a swivel axis and/or be made from an elastic material. Preferably, it can span along one or more than one section or continuously along the entire length of the upper edge and/or lower edge of the first portion of the rotor blade. Preferably more than one or each rotor blade comprises at least one wing element.

BRIEF DESCRIPTION OF THE DRAWINGS

The present invention will be described in more detail with reference to a preferred exemplary embodiment, wherein:

FIG. 6a shows a perspective view of a fluid turbine according to a fifth example;

FIG. 6b shows a first detailed view of a part of the rotor blade of FIG. 6a;

FIG. 6c shows a second detailed view of a part of the rotor blade of FIG. 6a;

FIG. 6d shows a third detailed view of a part of the rotor blade of FIG. 6a;

FIG. 8a shows a plan view of a fluid turbine according to a seventh example;

FIG. 8b shows a detailed view of a fluid slot of FIG. 8a;

FIG. 9 shows a sectional view along line IX-IX of FIG. 8a of a fluid turbine according to the seventh example;

FIG. 10 shows a sectional view along line X-X of FIG. 8a of a fluid turbine according to the seventh example.

DETAILED DESCRIPTION OF THE INVENTION

The invention, namely a fluid turbine and a rotor for a fluid turbine, will be described in an only exemplary manner with reference to examples embodied as a wind turbine or a rotor for a wind turbine. The following explanations therefore also apply to rotors and turbines for any other fluids, in particular water.

Figure 1:
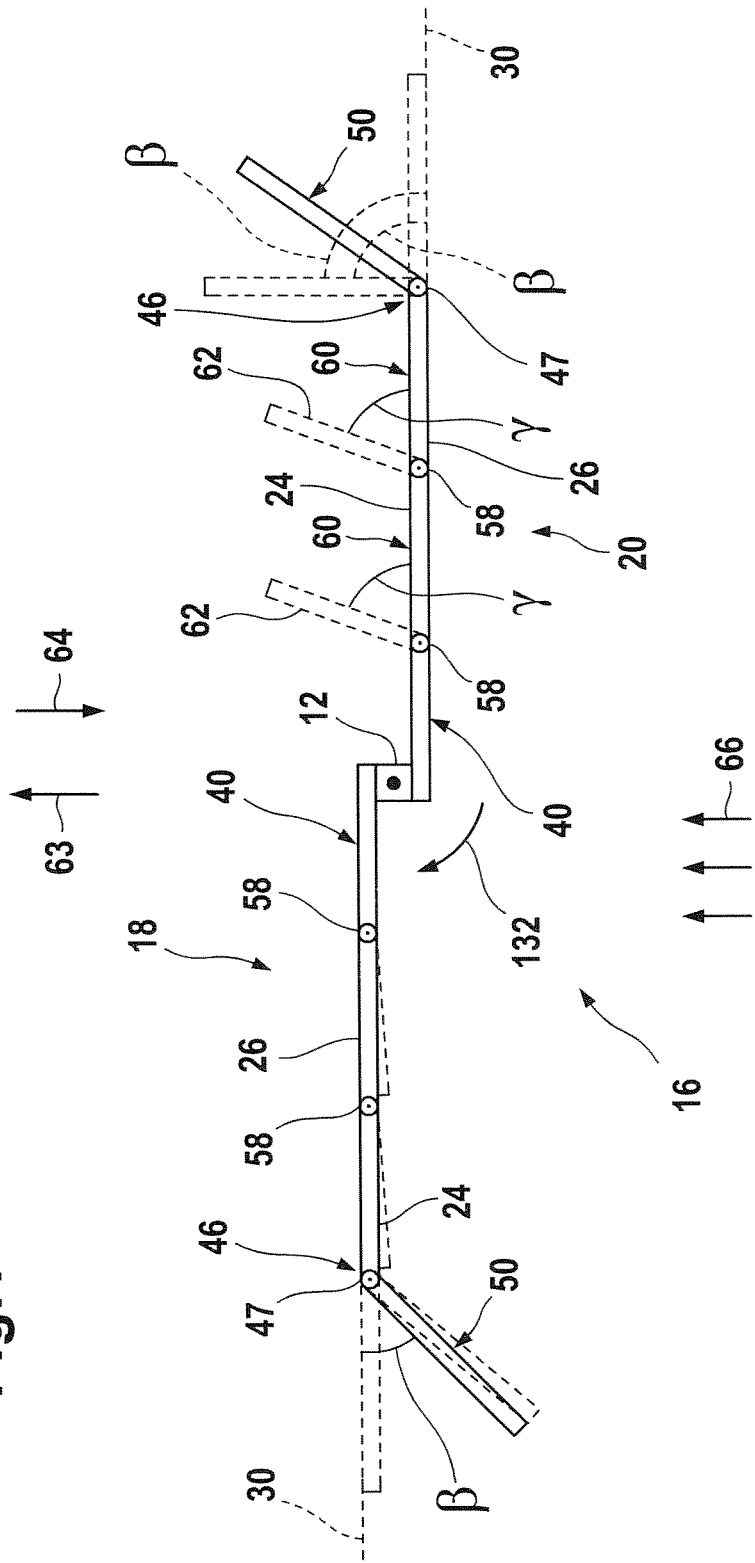
FIG. 1 shows a plan view of a rotor according to one example of the present invention.

FIG. 1 shows a plan view of a rotor 16 according to a first example of the present invention. In the present example, the rotor 16 comprises a vertical rotation axis 12, normal to the drawing plane in the present illustration, and two rotor blades 18, 20 arranged on the rotation axis 12. Alternatively, three, four, five or more rotor blades could also be arranged on the rotation axis 12 instead of the two rotor blades 18, 20. In the presently shown example, each rotor blade 18, 20 comprises a first portion 40 and a second portion 50. The second portion 50 is moveably arranged on the first portion 40. A virtual elongation 30 of the first portion 40 is formed by a virtual tangent placed on the end 46 of the first portion 40 facing away from the rotation axis 12. In the presently shown example, the virtual tangent is a prolongation of the first portion 40 since it is not curved. The second portion 50 is arranged on the first portion 40 in such a manner that an angle β, formed between the virtual elongation 30 of the first portion 40 and the second portion 50, has a variable value between about 0° and 90°. For this purpose, the second portion 50 is pivotably arranged on the first portion 40 via a pivot axis 47, which is essentially parallel to the rotation axis 12. The value of the angle β is dependent from the direction of the wind flow, or more generally the fluid flow. Depending on the angle β, the resistance against the wind or other fluid flow can be higher or lower. For example, when the angle β has low values, for example 0° to 45°, the rotor blade 18, 20 has a higher resistance against the flow. This is also referred to as the swung-out position of the second portion 50. When the flow impinges on a front side 24 of the rotor blade 18, 20, it can keep the second portion 50 in the swung-out position so that the angle β is at low values. Thus, the rotor blade 18, 20 is effectively moved in the direction of the flow 66, which is also referred to as a first direction 63. When the rotor blade 18, 20 moves in a second direction 64 which corresponds to the direction against the flow, the angle β formed between the virtual elongation of the first portion and the second portion is enlarged, for example to value between 45° and 90°, when the flow impinges on a back side 26 of the rotor blade 18, 20. This is also referred to as the folded-in position of the second portion 50. The position of the second portion 50 with an angle β of 90° is shown in dashed lines for the rotor blade 20 in FIG. 1. In this position, the flow 66 can pass the second portion 50 without impinging on it or merely at a flat angle. Thus, when the rotor blade 18, 20 is moved in the preferred direction of rotation 132, the side of the rotor blade 18, 20 moving against the direction of the wind or fluid flow 66 is more aerodynamic, in particular on the end of the rotor blade 18, 20 facing away from the rotation axis 12, and has a lower flow resistance.

In preferred embodiments, the angle β formed between the virtual elongation 30 of the first portion 40 and the second portion 50 can be restricted so that it can have a value between about 5° and 90°, preferably 5° and 80°, more preferably 10° and 75°. By these means, the wind or fluid flow can be effectively caught on the front side 24 between of the first portion 40 and the second portion 50 in the swung-out position of the second portion, as can be seen in FIG. 1 for the rotor blade 18 moving in the first direction 63. In the folded-in position of the second portion 50, angles of 90° or less, 80° or less, or 75° or less, provide a rotor blade where the fluid flow can effectively pass the back side of the rotor blade. At the same time, the second portion 50 can be moved from the swung-out position to the folded-in position and vice versa more quickly and at a lower sound level. It is not possible that the second portion 50 gets in contact with the back side 26 of the rotor blade 18, 20 in the area of the first portion, from where it would be harder to be moved into the swung-out position, which may cause losses in efficiency of the rotor 16.

In alternative embodiments, not every rotor blade 18, 20 need have a first and second portion 40, 50, as described above, but only one of two rotor blades, or any number of rotor blades in a rotor having more than two rotor blades, can have such first and second portions 40, 50.

In the presently shown example, two openings 60 having an openable closure element 62 are arranged in the first portion 40 of each of the rotor blades 18, 20. The closure element 62 is arranged in each case in such a manner that it closes the opening 60 when the rotor blade 18, 20 is moving in a first direction 63, which corresponds to the direction of the fluid flow 66, and that it opens the opening 60 when the rotor blade 18, 20 is moving in a second direction 64 which corresponds to the direction against the fluid flow. The direction of rotation 132 of the rotor 16, in the present example, is in the clockwise direction and corresponds to the preferred direction of rotation of the rotor 16. In the example shown in FIG. 1, two openings 60 with closure elements 62 are arranged in the portion 40 of each of rotor blades 18, 20. For the rotor blade 18, the closure elements 62 are indicated by dashed lines, since they are in a closed position in the present example. Alternatively, one, three, four or more openings 60, each having a closure element 62, could also be provided in the first portion 40 of the rotor blade 18, 20. The closure element 62, in the exemplary embodiment shown here, is arranged on the first portion 40 at a mounting axis 58 essentially parallel to the rotation axis 12. The mounting axis 58 provides for pivoting the closure element 62 to an angle γ with respect to the first portion 40. The angle γ can have maximum values of for example 15° to 45° when the closure elements 62 are in the opened position as shown in FIG. 1 for the rotor blade 20 in dashed lines. In alternative embodiments, the closure element 62 can be formed as a flap and made of an elastic material, which can bend, and can be arranged on the first portion 40 at a mounting axis for pivoting or at a rigid axis. In the example shown in FIG. 1, the closure element 62 is pivotably supported at one end on the side of the opening 60 closer to the rotation axis 12, wherein the other end of the closure element 62 extends radially outwards. The closure element 62 shown in the present exemplary embodiment is preferably arranged on the first portion 40 of the rotor blade 18, 20 such that it is pressed against the first portion 40 or a support element provided at the first portion 40 of the rotor blade 18, 20 and thus closes off the opening 60, when the rotor blade 18, 20 is moving in the direction of the flow 66. If the rotor blade 18, 20 is moved in the second direction 64 against the wind flow or water or other fluid flow, the closure element 62 automatically opens the opening 60, since the flow penetrating the openings 60 from the back side 26 of the rotor blade 18, 20, presses against the closure element 62 so that it swings open. In this way the flow resistance of the back side 26 of the rotor blade 18, 20 is further reduced.

The rotor 16 can have cut-outs in the area of the rotation axis 12 for the fluid flow to pass through these cut-outs in order to avoid accumulation of the fluid flow becoming too strong. The cut-outs are not visible due to the plan view of FIG. 1.

The turbine and its rotor as explained with respect to FIG. 1 can be used not only with wind, but also with any further fluids, e.g. water.

Figure 2:
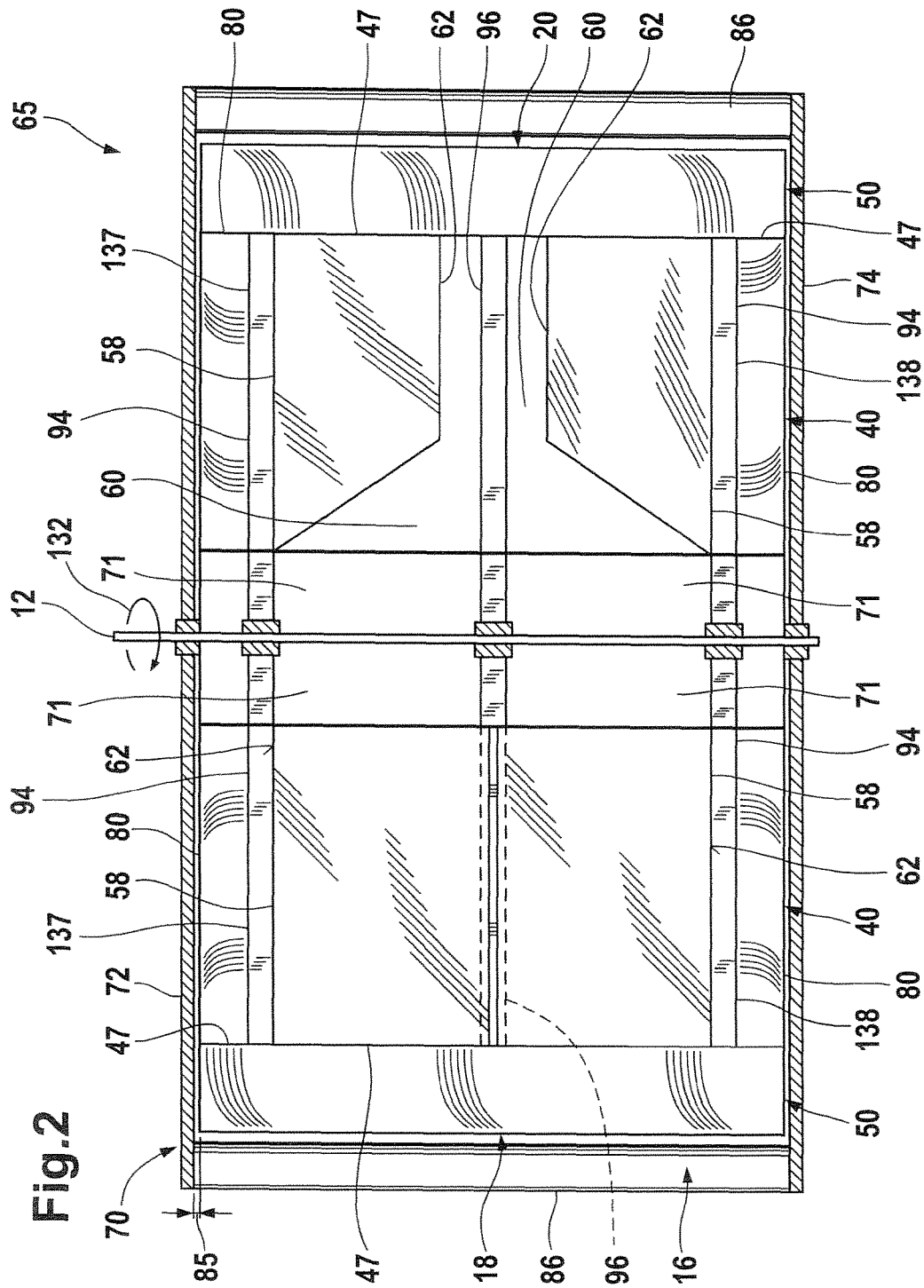
FIG. 2 shows a sectional view of a fluid turbine according to a first example of the present invention.

FIG. 2 shows a sectional view of a wind turbine 65 as an example of a fluid turbine according to a second example of the present invention. The wind turbine 65 comprises a housing, in which the rotor 16 is rotatably arranged relative to the housing 70. The illustration shown in FIG. 2 comprises two rotor blades 18, 20.

The housing 70 comprises a top 72 and a bottom 74 arranged essentially vertical to the rotation axis 12. The distance 85 between the top 72 of the housing 70 and the rotor blades 18, 20 and between the bottom 74 of the housing 70 and the rotor blades 18, 20 is preferably essentially constant in the radial direction. Carrier elements 94 are arranged at the rotation axis 12 essentially perpendicular to it, on which for example the mounting axes 58 of the openable closure elements 62 can be mounted. The carrier elements 94 are essentially parallel to a horizontal bar 96, which provides a support element for the closure elements 62 and can also contribute to stabilization of the rotor blade 18, 20.

Figure 3:
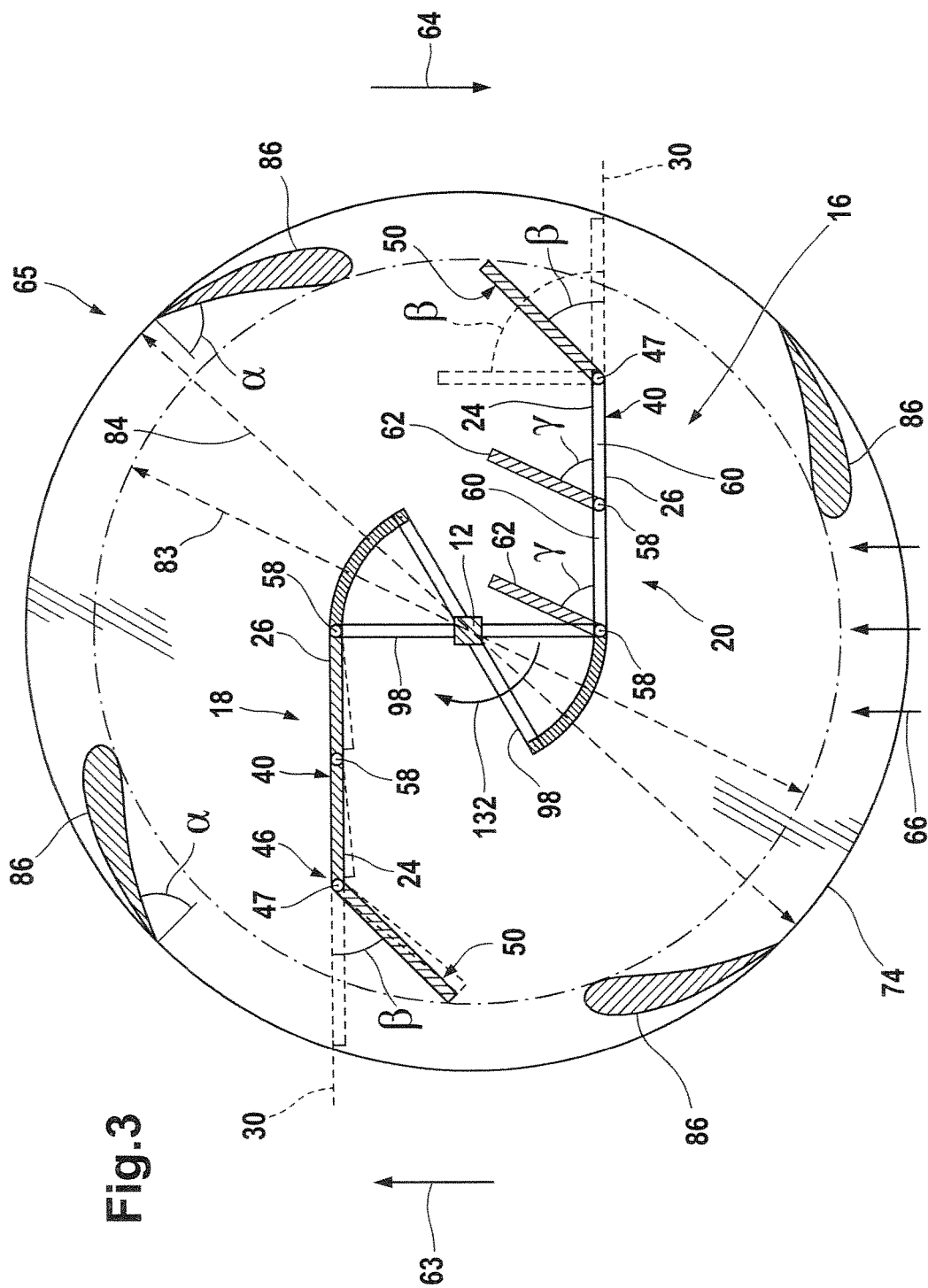
FIG. 3 shows a plan view of a fluid turbine according to a second example.

Support elements 86 are arranged between the bottom 72 and the top 74 of the housing 70, which are explained in more detail with FIG. 3.

In the present exemplary embodiment, the openable closure elements 62 are arranged on the first portion 40 at a mounting axis 58 essentially perpendicular to the rotation axis 12. The closure elements 62 on the rotor blade 18, shown here on the left, are shown in a closed state, which corresponds to a position which the closure elements 62 assume when the direction of the wind or fluid flow 66 (FIG. 1) is the first direction 63 (FIG. 1) and the direction of rotation 132 of the rotor 16 is as indicated. The closure elements 62 are in contact with the horizontal bar 96, which is shown in dashed lines since it is behind the closure element 62 in this sectional view. The horizontal bar 96 serves as a support element and prevents the closure element 62 from swinging through to the back side 26 (FIG. 1) of the rotor blade 18, 20. The horizontal bar 96 is arranged at the rotation axis 12. The closure elements 62 on the rotor blade 20, shown here on the right, are open since the rotor blade 20 moves in the second direction 64 (FIG. 1) against the wind flow. Through the opening 60, a portion of the opened closure element 62 is visible which, as shown in FIG. 1, is pivoted into the drawing plane.

The rotor blade 18, 20 shown in FIG. 2 further comprises four cut-outs 71, which are arranged between the rotor axis 12 and the openings 60. The cut-outs 71 are vertically bordered by the carrier elements 94 and the horizontal bar 96. The wind or fluid flow can pass through these cut-outs 71 and accumulation of the wind or fluid flow will not be too strong near the rotation axis 12. A percentage of area of the openings 60 and the cut-outs 71 is about 70% of the rotor blade 18, 20. In alternative embodiments, for example in embodiments where only the openings 60 or only the cut-outs 71 are provided, the percentage of area can be particularly smaller, e.g. 20%, 30%, 35%, 50% or 65% of the rotor blade, or any suitable percentage in between.

A wing element 80 is moveably arranged on each of an upper edge 137 and a lower edge 138 of the rotor blade 18, 20 shown here. The wing elements 80 can be flipped up by the wind or fluid flow in the direction of the top 74 or bottom 72 of the housing 70 when the wind flow impinges on the front side 24 (FIG. 1) of the rotor blade 18, 20 and moves the latter in the direction of rotation 132 of the rotor 16. By these means, the surface area of the rotor blade 18, 20 on which the wind or fluid flow impinges is enlarged, so that the latter can be better received by the rotor blade 18, 20. The wing elements 80 can be of a rigid or elastic material and, as an alternative to the simply curved shape indicated in FIG. 2, it can be partially straight, straight or curved in several places. In alternative embodiments, a wing element 80 of elastic material can be mounted pivotably at the upper edge 137 and/or the lower 138. Overall, the wing elements 80 are shaped and moveably arranged in such a manner that, in the flipped-up position, an air gap remains, for example in the order of a few millimeters, so that the wind flow can circulate and there is no disadvantageous air stall. This works also for any other arbitrary fluids, such as e.g. water. The height of the flipped-up wing elements 80 allows providing the distance 85 between the top 72 or the bottom 74 of the housing 70 and the rotor blade 18, 20 shown here. The wing element 80 can preferably not be folded beyond the upper or lower edge 137, 138 of the rotor blade 18, 20 towards the back side 26 of the rotor blade 18, 20. This can be seen in more detail for the rotor blade 18 in FIG. 9.

In alternative embodiments, the wing elements 80 can span along one or more than one section of the upper edge 137 and/or lower edge 138 of the first portion 40 of the rotor blade 18, instead of continuously along the entire length of the first portion 40 as shown in FIG. 2.

The second portion 50 is arranged at the end 46 (FIG. 1) of the first portion 40 at a pivot axis 47, which is essentially parallel to the rotation axis 12. The height of the second portion 50 in the present example is such that there is distance 85 between the top 72 and the bottom 74 of the housing 70 and the rotor blade 18, 20, but the second portion 50 is higher than the first portion 40.

The wind turbine 65 shown in FIG. 2 is in addition to air also suitable for similar operation with any other fluid flow, such as water.

FIG. 3 shows a plan view of a wind turbine 65 having a housing 70 according to a third exemplary embodiment of the present invention. In FIG. 3, the housing 70 comprises top and bottom 72, 74 having a circular circumference. For reasons of clarity, the top 72 is omitted in FIG. 3 so that the underlying rotor 16 is visible. The diameter 84 of the top and bottom 72, 74 is preferably larger than the diameter 83 of the rotor disk of the rotor blades 18. Support elements 86 for the top and bottom 72, 74, which are formed continuously from the top 72 to the bottom 74, are preferably arranged between the top and bottom 72, 74 of the housing 70 as shown in FIG.

3, in an area outside of the rotor disk of the rotor blades 18, 20. They mainly serve to support the top and bottom 72, 74 so that the rotor blades 18, 20, 22 are free to rotate between the top and bottom 72, 74 of the housing 70. The support elements 86 have a curved configuration in the present exemplary embodiment to guide the fluid flow so that it impinges, for example, at a favorable angle and/or at a changed speed on the rotor blades 18, 20 and/or so that the fluid flow impinging on the rotor blades 18, 20 is not negatively affected, such as by unfavorable swirling. In preferred embodiments, an angle α between an end of the support element 86 and a line pointing to the rotor axis 12 has values of for example 30° to 80°. More or less than four support elements 86 as shown, for example five, six or seven, or just two or three support elements 86 can be arranged between the top and bottom 72, 74 in equal or any distance to each other. The support elements 86 are not closer to the rotation axis 12 than the diameter 83 of the rotor disk of the rotor blades 18, 20 and do not contact the latter. The rotor blades 18, 20 essentially correspond to the rotor blades shown in FIG. 1, each rotor blade 18, 20 having a first portion 40 comprising two openings 60 provided with an openable closure element 62 mounted on a mounting axis 58, and a second portion 50 moveably arranged at the first portion 40 at a pivot axis 47.

In the present example, the rotor blades 18, 20 are arranged at a predetermined distance to each other and to the rotation axis 12 such that they overlap each other in the area of the rotation axis 12. They are attached to the rotation axis 12 via mounting elements 98. In the shown example, the first portion 40 of the rotor blade 18, 20 is partially curved, namely in the area near the rotation axis 12 in which the mounting elements 98 are attached. The particular form of the rotor blade 18, 20 leads to the wind or fluid flow arriving at the front side 24 of the rotor blade 18, 20 being guided along this part of the first portion 40 and passing the rotation axis 12 such that it impinges on the front side 24 of the other rotor blade 18, 20 forcing the latter forward in the direction of rotation 132.

The second portion 50 of each rotor blade 18, 20 is arranged such that the angle β formed between the virtual elongation 30 of the first portion 40 and the second portion 50 is restricted to a maximum angle in the swung-out position that can be seen for the rotor blades 18, 20 in FIG. 3. The maximum of the angle β is such that the second portion 50 will not get in contact with the support elements 86 when the rotor 16 is rotating in the direction 132, indicated by an arrow. For the rotor blade 20, the folded-in position of the second portion 50 is indicated in dashed lines at an angle β of 90°.

The wind turbine 65 shown in FIG. 3 is in addition to air also suitable for similar operation with any other fluid flow, such as water.

Figure 4:
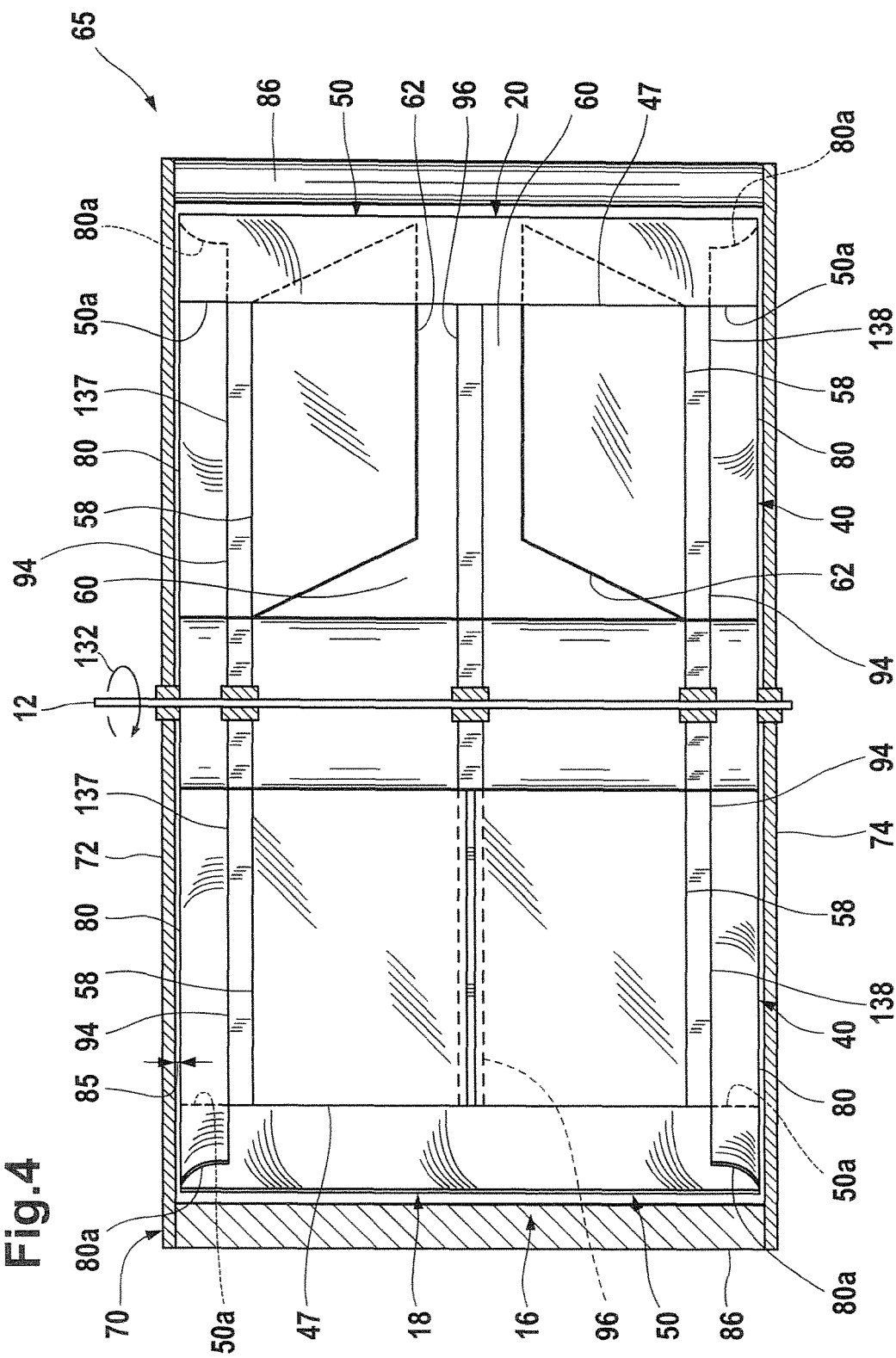
FIG. 4 shows a sectional view of a fluid turbine according to a third example.

FIG. 4 shows a sectional view of a wind turbine 65 according to a fourth example, wherein the rotor 16 essentially corresponds to the rotor shown in FIG. 3 with overlapping rotor blades 18, 20 in the area of the rotation axis 12, being arranged at a predetermined distance to each other. In contrast to the rotor in FIG. 3, the rotor 16 in the present example comprises openings 60 with an openable closure element 62 that each has a mounting axis 58 perpendicular to the rotation axis 12 of the rotor 16. The number of openings 60 with an openable closure element 62 can be different for each rotor blade 18, 20. In alternative embodiments, one, three, four or more openings with an openable closure element can be provided on at least one rotor blade. In further alternative embodiments, openings with an openable closure element being arranged at a mounting axis parallel and perpendicular to the rotation axis 12 can be arranged next to each other on a first portion 40 of a rotor blade 18, 20.

The wing element 80 shown in FIG. 4 has a horizontal elongation 80a that protrudes from the first portion 40. In this area, a vertical elongation 50a of the second portion is arranged. The arrangement of the horizontal elongation 80a and the vertical elongation of the second portion 50 is described in further detail with reference to FIG. 6a-d.

The wind turbine 65 shown in FIG. 4 can also be operated with other fluids instead of air, preferably for example with water.

Figure 5:
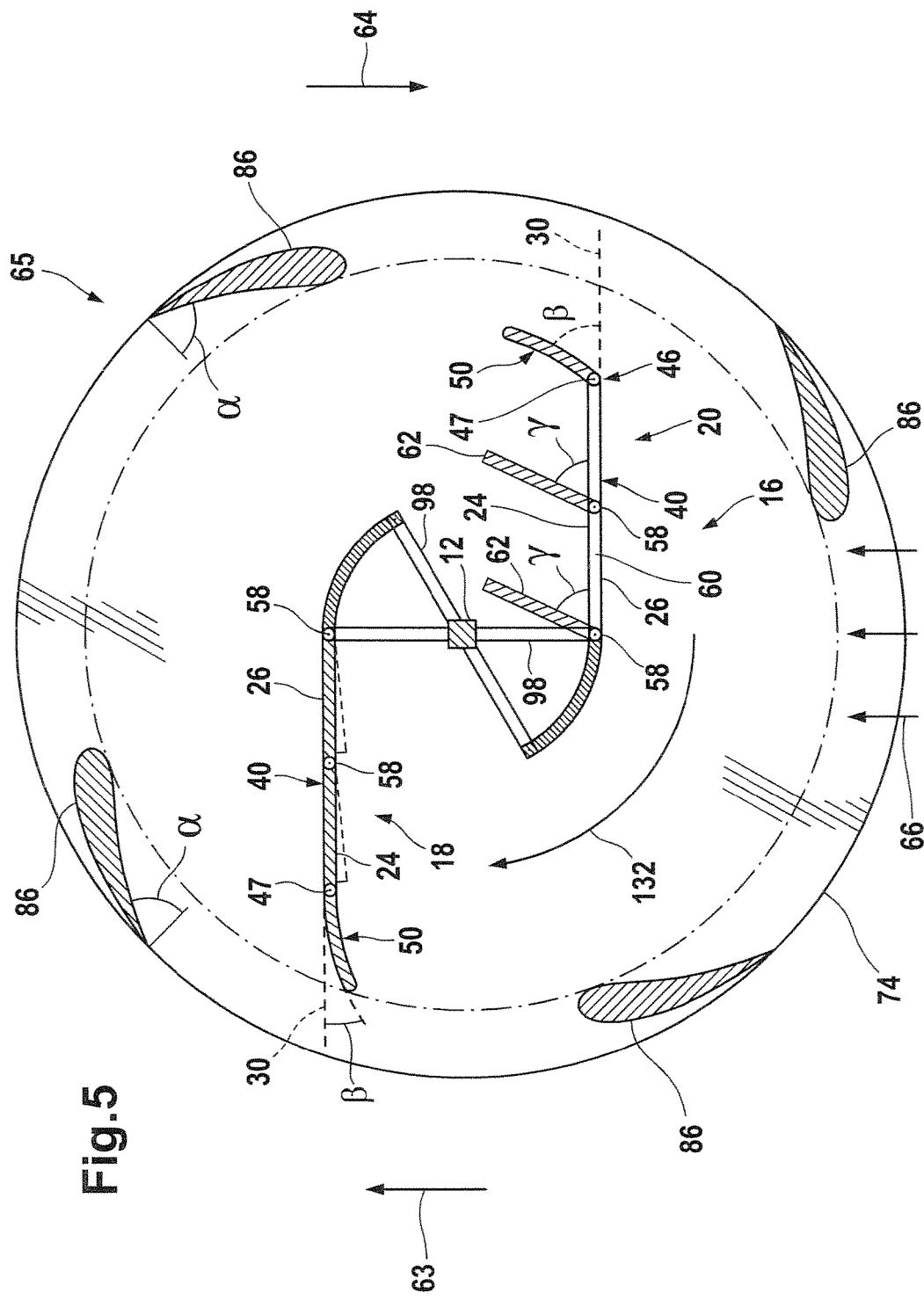
FIG. 5 shows a plan view of a fluid turbine according to a fourth example.

FIG. 5 shows a plan view of a wind turbine 65 according to a fifth example. The wind turbine 65 essentially corresponds to the wind turbine shown in FIG. 3, apart from the form of the second portion 50 being curved. By these means, the rotor blades 18, 20 may provide a more aerodynamic surface for the wind flow 66 impinging and/or flowing along the rotor blade 18, 20, than straight parts. The wind turbine 65 is shown in operation, in which the second portion 50 of the rotor blade 18 moving in the first direction 63 is in a swung-out position and the closure elements 62 close up the opening 60 of the rotor blade 18 such that the wind flow can effectively be used to drive the rotor 16 in the direction of rotation 132. The second portion 50 of the other rotor blade 20 moving against the wind flow 66 in the second direction 64 is in the folded-in position and the closure elements 62 are in the open position, so that the wind flow 66 can flow through and pass the rotor blade 20 with very low resistance.

The wind turbine 65 shown in FIG. 5 is in addition to air also suitable for similar operation with any other fluid flow, such as water.

Figure 6:
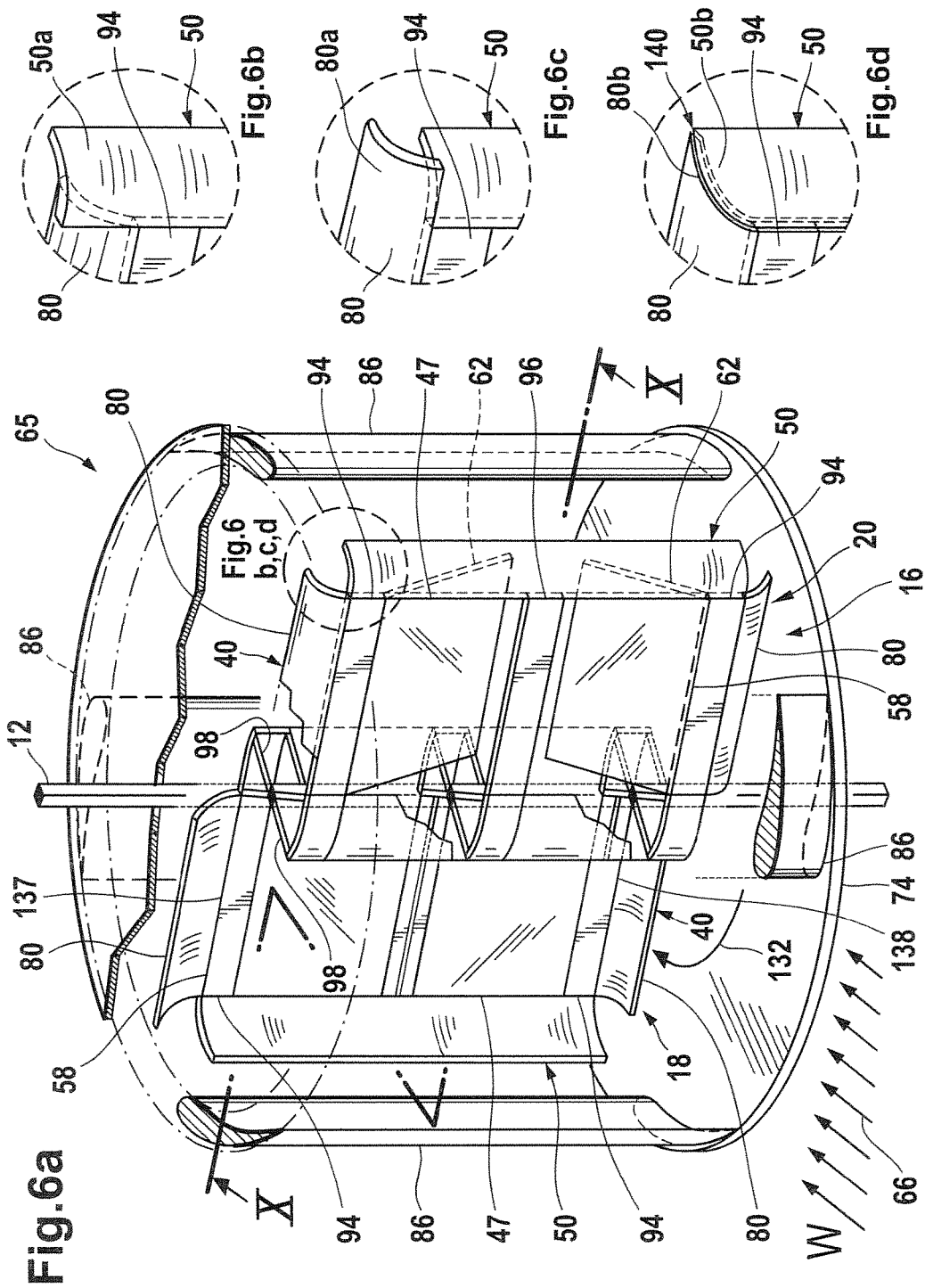

FIG. 6a shows a perspective view of a wind turbine 65 according to a sixth example. The wind turbine 65 essentially corresponds to the wind turbine shown in FIG. 5. The wind flows into the drawing layer and is correspondingly depicted by arrows 66. In FIG. 6a, the wing element 80 has the same length as the upper and lower edge 137, 138 of the first portion 40 and the carrier elements 94. The second portion 50 extends vertically along the first portion 40 and does not protrude into the area of the wing element 80 above the upper edge 137, and the lower edge 138, respectively.

However, in the area where the second portion 50 and the wing element 80 are close to each other, they can be arranged in different ways, as can be seen in the detailed view of FIGS. 6b-d. In the first detailed view in FIG. 6b, the wing element 80 has the same extension as in FIG. 6a, but the second portion 50 has a vertical elongation 50a that protrudes the carrier element 94 and has an essentially rectangular form. In the second detailed view FIG. 6c, the wing element 80 has a horizontal elongation 80a and protrudes the first portion 40 and has an essentially rectangular form, whereas the second portion 50 has the same height as the first portion 40 from the lower edge 138 to the upper edge 138. FIG. 6d shows a third detailed view in which the wing element 80 has a horizontal elongation 80b with a diagonal end, and the second portion 50 has a vertical elongation 50b with a diagonal end. When the wing element 80 is in a low position, for example when the wind flow impinges on the back side 26 (FIG. 5) of the rotor blade 18, 20, and the second portion 50 is in the folded-in position, as for example shown in FIG. 5 for the rotor blade 20, the horizontal and vertical elongations 80b and 50b form an open miter 140. In all of the shown arrangements, the wing element 80 and the second portion 50 are preferably arranged such that they do not overlap and/or contact each other. This can for example be achieved by restricting the angles that the wing element 80 and the second portion 50 may pivot or by choosing suitable elastic materials for the wing element 80 and the second portion 50 that allow for appropriate movement of these elements.

The wind turbine 65 shown in FIGS. 6a-d can also be operated with other fluids instead of air, preferably for example with water.

Figure 7:
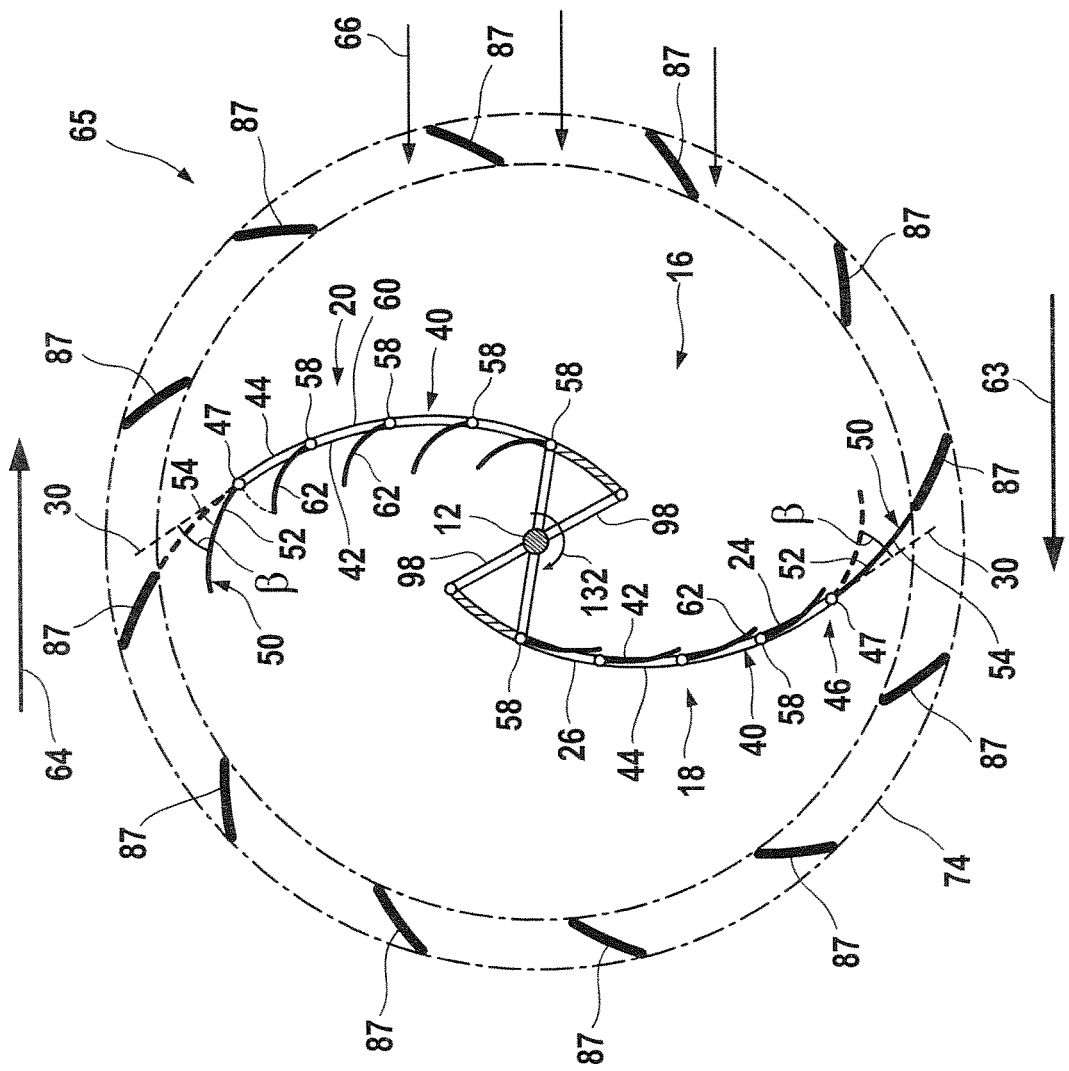
FIG. 7 shows a plan view of a fluid turbine according to a sixth example.

FIG. 7 shows a plan view of a wind turbine 65 according to a seventh example. Both the first and the second portions 40, 50 are curved. The first portion 40 has a concave side 42 and a convex side 44, and the second portion 50 has a concave side 52 and a convex side 54. The two portions 40, 50 are arranged in such a manner that, in the radial direction, the concave side 42 of the first portion 40 is followed by the concave side 52 of the second portion 50. At the same time, a back side 26 of the rotor blade 18, 20 is formed by the convex side 44 of the first portion 40 followed by the convex side 54 of the second portion 50. This has the advantage that the rotor blade 18, 20 as a whole is more aerodynamic for the wind flow impinging and/or flowing along the rotor blade 18, 20.

Four openings 60 having an openable closure element 62 are arranged in the first portion 40 of each of the rotor blades 18, 20. The closure element 62 is arranged in each case in such a manner that it closes the opening 60 when the rotor blade 18, 20 is moving in the first direction 63, which corresponds to the direction of the wind flow 66, and that it opens the opening 60 when the rotor blade 18, 20 is moving in the second direction 64 which corresponds to the direction against the wind flow. The direction of rotation 132 of the rotor 16, in the present example, is in the clockwise direction and corresponds to the preferred direction of rotation of the rotor 16. In alternative embodiments, one, two, three, five or more openings 60, each having a closure element 62, could also be provided in the first portion 40 of the rotor blade 18, 20. The closure element 62, in the exemplary embodiment shown here, is formed as a flap and of an elastic material, which can bend. However, the flap can also be of a rigid material. In the example shown in FIG. 7, the flap is pivotably supported on a mounting axis 58 at one end on the side of the opening 60 closer to the rotation axis 12, wherein the other end of the flap extends radially outwards. When the flap closes off the opening 60, the radially inwardly extending end of the flap, for example, is arranged on the first portion 40 of the rotor blade 18, 20 adjacent to the opening 60. The flap shown in the present exemplary embodiment is preferably arranged such that it is pressed against the first portion 40 of the rotor blade 18, 20, for example against the mounting axis 58 of the adjacent opening 60 or the pivot axis 47 of the second portion 50. Thus, it closes off the opening 60, when the rotor blade 18, 20 is moving in the direction of the wind flow 66. If the rotor blade 18, 20 is moved in the direction of rotation 132 in the second direction 64 against the wind flow, the flap automatically opens the opening, since the wind flow penetrating the openings 62 from the back side 26 of the rotor blade 18, 20, presses against the flap so that it swings open. In this way the flow resistance of the back side 26 of the rotor blade 18, 20 is reduced.

The second portions 50 are made from an elastic material in the example shown in FIG. 7. It is on a swung-out position on the rotor blade 18 moving in the direction of the wind flow 66 and in the folded-in position on the rotor blade 20 moving against the wind flow 66. Dashed lines show the respective other position for each rotor blade 18, 20. The virtual elongation 30 of the first portion 40 corresponds to a virtual tangent placed on the end 46 of the first portion 40 facing away from the rotation axis 12 and is also shown in dashed lines in FIG. 7. In the swung-out position, the second portion 50 does not contact the support elements 87 which are placed in equal distance between the top 72 (FIG. 2) and the bottom 74 (FIG. 2) of the housing 70 (FIG. 2) which are not depicted in FIG. 7 due to clear arrangement. More or less than twelve support elements 87 as shown, for example two, three four, five, six or seven, or fifteen or twenty support elements 87 can be arranged between the top and bottom 72, 74 in equal or any distance to each other.

The wind turbine 65 shown in FIG. 7 can also be operated in a similar manner with other fluids instead of air, preferably for example with water.

FIG. 8a shows a plan view of a wind turbine 65 according to a eighth example, which can also be operated with other fluids instead of air, for example with water. The top and bottom 72, 74 are square at the outer edges 81 in the present example, wherein here neither the bottom 74 nor the rotor blades are shown so that the top 72 is visible. Support elements 90 are arranged between the top 72 and bottom 74 (not shown) at the four corners of the top 72 and bottom. The support elements 90 extending from the top 72 to the bottom 74 have a curved cross-section. However, other shapes such as rods, for example having a round cross-section, or as square or wedge-shaped cross-sections are also possible, and can in this way influence the direction of the wind or fluid flow. The number of the support elements 90 can differ from and can particularly be larger than the number of the support elements 90 shown in FIG. 8a. For example, two, three, five, six, seven or more support elements 90 can be provided. Otherwise the support elements 90 serve to support the top 72 and bottom of the housing 70 so that the rotor blades 18, 20 are free to rotate between the top 72 and bottom.

In further alternative embodiments, not shown here, the top and bottom of the housing can also be circular, triangular or have more than four corners, and the top can also have a different shape from the bottom.

In the present exemplary embodiment four fluid slots 82 are arranged in the top 72. Instead of the four fluid slots 82 in the top 72, it is also possible in further preferred exemplary embodiments, to arrange only one, two, three, but also five, six or more fluid slots 82 in the top 72. One or more fluid slots 82 can also be arranged on the bottom 74 of the housing 70, as also shown in FIGS. 9 and 10. The opening of the fluid slots 82 is created by a cover element 88, which is created, for example, by a bulge of the top 72 above the fluid slot 82. The or each opening can also be created by removing a part of the top 72, thus creating a fluid slot 82, and integrally forming a corresponding, separate cover element, thus defining the direction of the opening. The direction of the opening of the fluid slot 82 preferably depends on the direction of rotation 132 of the rotor, of which only the rotation axis 12 is visible in the present illustration for reasons of clarity. The opening of the fluid slots 82 corresponds to the direction of rotation 132 of the rotor, i.e. the rotor blades pass below each fluid slot 82 of the top 72, or above each fluid slot 82 of the bottom 74 (FIG. 10), passing the area of the opening first and then a rear end 93 of the fluid slot 82. The direction of rotation 132 corresponds to the preferred direction of rotation of the rotor. FIG. 8b shows a detail view of the fluid slot 82 in the top 72 of the housing 70. The fluid slots 82 will be described in more detail with reference to FIGS. 9 and 10.

FIG. 9 shows a sectional view along line IX-IX of FIG. 8a of the wind turbine 65 according to the eighth example. Here, a support element 90 (FIG. 8a), which is behind the rotor blade 18 in the perspective, is not shown for clarity. A wing element 80 is moveably arranged on each of an upper edge 137 and a lower edge 138 of the rotor blade 18 shown here. On the other hand, the wing elements 80 can be flipped up by the wind flow or the flow of some other fluid in the direction of the top or bottom 72, 74 of the housing 70 when the wind flow impinges on the front side 24 of the rotor blade 18 and moves the latter in the preferred direction of rotation of the rotor in the first direction 63. By these means, the surface area of the rotor blade 18 on which the wind flow impinges is enlarged, so that the latter can be better received by the rotor blade 18. The wing elements 80 can be of a rigid or elastic material and, as an alternative to the simply curved shape shown in FIG. 9, it can be partially straight, straight or curved in several places. Overall, they are shaped and moveably arranged in such a manner that, in the flipped-up position, an air gap remains, for example in the order of a few millimeters, so that the wind flow can circulate and there is no disadvantageous air stall. This means that the height of the flipped-up wing elements 80 still leaves a gap that corresponds to the distance 85 (FIG. 2) between the top 72 or the bottom 74 of the housing 70 and the rotor blade 18 shown here. The wing element 80 can preferably not be folded beyond the upper or lower edge 137, 138 of the rotor blade 18 towards the back side 26 of the rotor blade 18.

On the other hand, the wing elements 80 can be folded down when the wind flow impinges on the back side 26 of the rotor blade 18 and thus the back side 139 of the wing element 80, when the rotor blade 18 is moving in the preferred direction of rotation of the rotor in the second direction 64 against the wind flow. This folded-down position is shown in FIG. 9 in an exemplary manner with a broken line. In the folded-down position of the wing elements 80, the wind flow can escape better between wing elements 80 and the rotor blade 20 than in the flipped-up position of the wing element 80, thus reducing the pressure exerted on the back side 26 of the rotor blade 20.

FIG. 9 also shows a fluid slots 82 arranged in the top 72 of the housing 70. The fluid slots 82 have their opening aligned by the cover element 88 in such a manner that a wind flow moves across the fluid slots 82 in the second direction 64. Due to the Bernoulli effect, a suction is created by the wind flow sucking air out of the housing 70 through the fluid slots 82. When the rotor blade 18 is moving in the preferred direction of rotation of the rotor in the second direction 64 against the wind flow, returning of the rotor blade 18 in the preferred direction of rotation of the rotor against the wind flow is facilitated since the pressure on the back side 26 of the rotor blade 18 is reduced in this area. A wind flow in the first direction 63 can pass through the opening into the housing 70 and onto the front side 24 of the rotor blade 18. By the additional intake of wind flow onto the front side 24 of the rotor blade 18 the rotor is driven more effectively.

As an alternative, a fluid slot 82 can additionally be arranged in the bottom 74 of the housing 70, or a plurality of fluid slots 82 can be arranged in the top and bottom 72, 74 of the housing 70, as also shown in the examples of FIGS. 8*a* and 10.

FIG. 10 shows a sectional view along line X-X of FIG. 8*a* of the wind turbine according to the eighth example. Fluid slots 82 with cover elements 88 are shown, each of which are arranged on the top 72 and the bottom 74 of the housing 70 in the area in which the outer sides of the rotor blades 18, 20 move. Since this area of the outer sides of the rotor blades 18, 20, remote from the rotation axis, exhibits great lever action, an additional intake of wind flow onto the front side and withdrawal of wind flow from the back side of the rotor blades 18, 20 is particularly effective here. For fluid slots 82, shown on the left side of the housing 70 in the present illustration, the opening faces out of the drawing plane. On the right side of the present illustration of the housing 70, the openings of the fluid slots 82 arranged there face into the drawing plane. In alternative embodiments, the fluid slots 82 can also be expanded in the radial direction of the rotor 16 and/or in the direction of the rotation axis 12, or a plurality of fluid slots 82 can be arranged side-by-side.

Aside from the fluid slots 82, the wind turbine 65 according to the eighth example essentially corresponds to the wind turbine described with regard to FIG. 4. The wind turbine 65 shown in FIGS. 8*a,b* to 10 can also be operated with other fluids instead of air, preferably for example with water.

LIST OF REFERENCE NUMERALS

12 rotation axis
16 rotor
18 rotor blade
20 rotor blade
24 front side
26 back side
30 virtual elongation
40 first portion
42 concave side
44 convex side
46 end of first portion
47 pivot axis
50 second portion
50*a* vertical elongation
50*b* vertical elongation
52 concave side
54 convex side
58 mounting axis
60 opening
62 closure element
63 first direction
64 second direction
65 fluid turbine
66 direction of flow
70 housing
71 cut-out
72 top
74 bottom
80 wing element
80*a* horizontal elongation
80*b* horizontal elongation
81 outer edges
82 fluid slot
83 diameter
84 diameter
85 distance
86 support elements
87 support elements
88 cover element
90 support elements
93 rear end of fluid slot
94 carrier elements
96 horizontal bar
98 mounting elements
132 direction of rotation of rotor
137 upper edge
138 lower edge
139 back side of wing element
140 miter
α angle β angle
γ angle
W wind

What is claimed is:

1. A fluid turbine, comprising:
a rotor with a rotation axis and at least two rotor blades arranged within a housing,
wherein a top and a bottom of the housing are arranged essentially perpendicular to the rotation axis,
wherein the rotor is rotatable relative to the housing,
wherein at least one support element is arranged between the top and the bottom of the housing, wherein at least one fluid slot with a cover element is arranged at one or more of the top and the bottom of the housing, and wherein the cover element is created by a bulge of one or more of the top and the bottom of the housing above the at least one fluid slot, and wherein a wing element is arranged on one or more of an upper edge or a lower edge of at least one of the at least two rotor blades.

2. The fluid turbine according to claim 1, wherein the at least one support element is arranged outside the diameter of the rotor disk of the rotor.

3. The fluid turbine according to claim 2, wherein the at least one support element is formed continuously from the top to the bottom of the housing.

4. The fluid turbine according to claim 1, wherein the at least one support element is formed continuously from the top to the bottom of the housing.

5. The fluid turbine according to claim 1, wherein the at least one support element has a curved configuration.

6. The fluid turbine according to claim 1, wherein the at least one support element has a curved, round, wedge-shaped or square cross-section.

7. The fluid turbine according to claim 1, wherein an angle α between an end of the at least one support element and a line pointing to the rotation axis has values from 30° to 80°.

8. The fluid turbine according to claim 1, wherein the distance between the top of the housing and the rotor blades and between the bottom of the housing and the rotor blades is essentially constant.

* * * * *